United States Patent
Yanagishima (10) Patent No.: US 7,848,066 B2
(45) Date of Patent: Dec. 7, 2010

(54) MOTOR DRIVE DEVICE AND ELECTRONIC DEVICE USING THE SAME

(75) Inventor: Daiki Yanagishima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 508 days.

(21) Appl. No.: 11/995,026

(22) PCT Filed: Jul. 11, 2006

(86) PCT No.: PCT/JP2006/313749

§ 371 (c)(1),
(2), (4) Date: Jan. 8, 2008

(87) PCT Pub. No.: WO2007/007742

PCT Pub. Date: Jan. 18, 2007

(65) Prior Publication Data

US 2010/0117577 A1    May 13, 2010

(30) Foreign Application Priority Data

Jul. 12, 2005  (JP) .............................. 2005-202414
May 8, 2006  (JP) .............................. 2006-128931

(51) Int. Cl.
*H02H 7/08* (2006.01)

(52) U.S. Cl. ................. 361/23; 361/1; 361/31; 361/87; 361/93.1; 361/93.9; 361/101; 318/432; 318/434

(58) Field of Classification Search ............. 361/23, 361/1, 31, 87, 93.1, 93.9, 101; 318/432, 318/434
See application file for complete search history.

(56) References Cited

U.S. PATENT DOCUMENTS

| | | | | |
|---|---|---|---|---|
| 4,208,621 A | * | 6/1980 | Hipkins et al. | 318/400.21 |
| 4,535,378 A | * | 8/1985 | Endo | 361/18 |
| 4,875,000 A | * | 10/1989 | Fry et al. | 318/798 |
| 5,280,228 A | * | 1/1994 | Kanouda et al. | 318/803 |
| 5,687,049 A | * | 11/1997 | Mangtani | 361/18 |
| 5,689,395 A | * | 11/1997 | Duffy et al. | 361/93.6 |
| 5,986,442 A | * | 11/1999 | Abe et al. | 323/283 |
| 6,633,471 B1 | * | 10/2003 | Ko | 361/93.1 |

FOREIGN PATENT DOCUMENTS

| | | |
|---|---|---|
| JP | 05-111144 | 4/1993 |
| JP | 05-111145 | 4/1993 |
| JP | 11-206189 | 7/1999 |

* cited by examiner

*Primary Examiner*—Rita Leykin
(74) *Attorney, Agent, or Firm*—Fish & Richardson P.C.

(57) ABSTRACT

A motor drive device includes: chopping signal generation means for generating a chopping signal Sa when drive current of a driver has reached a first threshold value; chopping signal cut-off means for cutting off the chopping signal Sa when the drive current has reached a second threshold value which is greater than the first threshold value; and overcurrent protection means for generating an overcurrent protection signal Se when the drive current has reached a third threshold value which is greater than the first threshold value and its continuation time has reached a predetermined threshold value time. Thus it is possible to simultaneously obtain the constant current chopping function and the overcurrent protection function and to improve its reliability and safety.

6 Claims, 7 Drawing Sheets

MOTOR DRIVE DEVICE AND ELECTRONIC DEVICE USING THE SAME

TECHNICAL FIELD

The present invention relates to a motor drive device for controlling the driving of a motor, and also relates to an electric device incorporating such a motor drive device. More particularly, the present invention relates to improvements in the reliability and safety of such motor drive devices and electric devices.

BACKGROUND ART

Conventionally, there have been disclosed and proposed various types of motor drive devices that detect the current flowing through an output stage switching device (a power transistor) and chop the on-period of the switching device so as to keep the current at a predetermined target value (i.e., that have a so-called constant-current chopping capability) (see patent document 1 listed below).

There have also been disclosed and proposed various types of motor drive devices that detect overcurrent resulting from an abnormal state at an output terminal (such as its short-circuiting to the supply voltage) and latch a switching device in an off state when the overcurrent continues beyond a predetermined threshold period (i.e., that have a so-called overcurrent protection capability) (see patent documents 2 and 3 listed below).

Patent document 1: JP-A-H11-206189
Patent document 2: JP-A-H05-111144
Patent document 3: JP-A-H05-111145

DISCLOSURE OF THE INVENTION

Problems to be Solved by the Invention

To be sure, with the above-described motor drive device having the constant-current chopping capability, it is possible to keep the current flowing through an output stage switching device at a predetermined target value; with the above-described motor drive device having the overcurrent protection capability, it is possible to prevent the device from breaking down, getting overheated or otherwise damaged in the event of overcurrent.

And a motor drive device can be equipped with either the constant-current chopping capability alone or the overcurrent protection capability alone without any problem. However, if a motor drive device is equipped with both these capabilities with no coordination made between them, the constant-current chopping capability may unexpectedly hamper the overcurrent protection capability.

What can happen here will now be described in detail. Conventionally, the constant-current chopping capability is achieved by making an output stage switching device continue chopping so long as the current flowing therethrough is above a predetermined target value, irrespective of whether the overcurrent results from an abnormal state at the output terminal.

Thus, if a motor drive device is equipped with both the constant-current chopping and overcurrent protection capabilities with no consideration given to their mutual interference, even in the event of continuous overcurrent, the constant-current chopping capability breaks the continuity of the overcurrent, and in the worst case leads the overcurrent protection capability to fail to detect the continuous overcurrent.

Once this happens, the overcurrent protection capability no longer works, and lets chopping continue while the overcurrent goes undetected. Now, the output stage switching device has to rely on its own resistance to breakdown to protect itself from breakdown, and thus, if the switching device is poorly resistant to breakdown, the intermittent overcurrent may eventually cause it to break down.

An object of the present invention is to provide a motor drive device that is equipped with both a constant-current chopping capability and an overcurrent protection capability on a compatible basis and that thus operates with improved reliability and safety, and also to provide an electric device incorporating such a motor drive device.

Means for Solving the Problem

To achieve the above object, according to one aspect of the present invention, a motor drive device for turning on and off an output stage switching device to control the driving of a motor includes: chopping signal generating means for generating, when a current flowing through the switching device reaches a first threshold value, a chopping signal for chopping the on-period of the switching device; chopping signal interrupting means for interrupting the chopping signal when the current flowing through the switching device reaches a second threshold value greater than the first threshold value; and overcurrent protection means for generating, when the current flowing through the switching device reaches a third threshold value greater than the first threshold value and thereafter remains equal to the third threshold value for a duration equal to a predetermined threshold period, an overcurrent protection signal for latching the switching device in an off state (a first configuration).

In the motor drive device of the first configuration, the second threshold value may be equal to the third threshold value (a second configuration).

The motor drive device of any of the first and second configurations may further include means for generating, in separate systems, first and second reference voltages whose voltage levels vary according to the current flowing through the switching device so that, while the chopping signal generating means and the chopping signal interrupting means respectively generate and interrupt the chopping signal based on the first reference voltage, the overcurrent protection means generates the overcurrent protection signal based on the second reference voltage (a third configuration).

According to another aspect of the invention, a motor drive device for turning on and off an output stage switching device to control the driving of a motor includes: chopping signal generating means for generating, when a current flowing through the switching device reaches a first threshold value, a chopping signal for chopping the on-period of the switching device; overcurrent protection means for generating, when the current flowing through the switching device reaches a second threshold value greater than the first threshold value and thereafter remains equal to the second threshold value for a duration equal to a predetermined threshold period, an overcurrent protection signal for latching the switching device in an off state; and chopping signal interrupting means for interrupting the chopping signal when the overcurrent protection means detects the current flowing through the switching device to have reached a second threshold value greater than the first threshold value (a fourth configuration).

The motor drive device of the fourth configuration may further includes means for generating, in separate systems, first and second reference voltages whose voltage levels vary according to the current flowing through the switching device, so that, while the chopping signal generating means generates the chopping signal based on the first reference voltage, the overcurrent protection means and the chopping signal interrupting means respectively generate and interrupt the overcurrent protection signal and the chopping signal based on the second reference voltage (a fifth configuration).

According to yet another aspect of the invention, an electric device includes a motor and a motor drive device for controlling the driving of the motor. Here, the electric device includes, as the motor drive device, the motor drive device of any one of the first to fifth configurations (a sixth configuration).

Advantages of the Invention

The present invention helps realize motor drive devices, and electric devices incorporating them, that are equipped with both a constant-current chopping capability and an overcurrent protection capability on a compatible basis and that thus operate with improved reliability and safety.

LIST OF REFERENCE SYMBOLS 1a, 1b, 1c Motor drive device
2 Motor
3U, 3V, 3W Hall sensor
11 Hall comparator
12 Logic section
13 Pre-driver section
14 Driver section
15, 17 Constant-current chopping section
151, 171 Comparator
152, 172 Comparator
153, 173 Chopping signal generating circuit
154, 174 AND circuit
155 Inverter
16, 18 Overcurrent protection section
161, 181 Sense resistor
162, 182 Comparator
163, 183 Timer circuit
P1 to P3 P-channel field-effect transistor (high-side output)
N1 to N3 N-channel field-effect transistor (low-side output)
P4 to P6 P-channel field-effect transistor (high-side monitor)
N4 to N6 N-channel field-effect transistor (low-side monitor)
Rex 1, Rex 2 Sense resistor

BEST MODE FOR CARRYING OUT THE INVENTION

Hereinafter, the present invention will be described in detail by way of an example in which it is applied to a motor drive device for controlling the driving of a three-phase full-wave motor.

Figure 1:
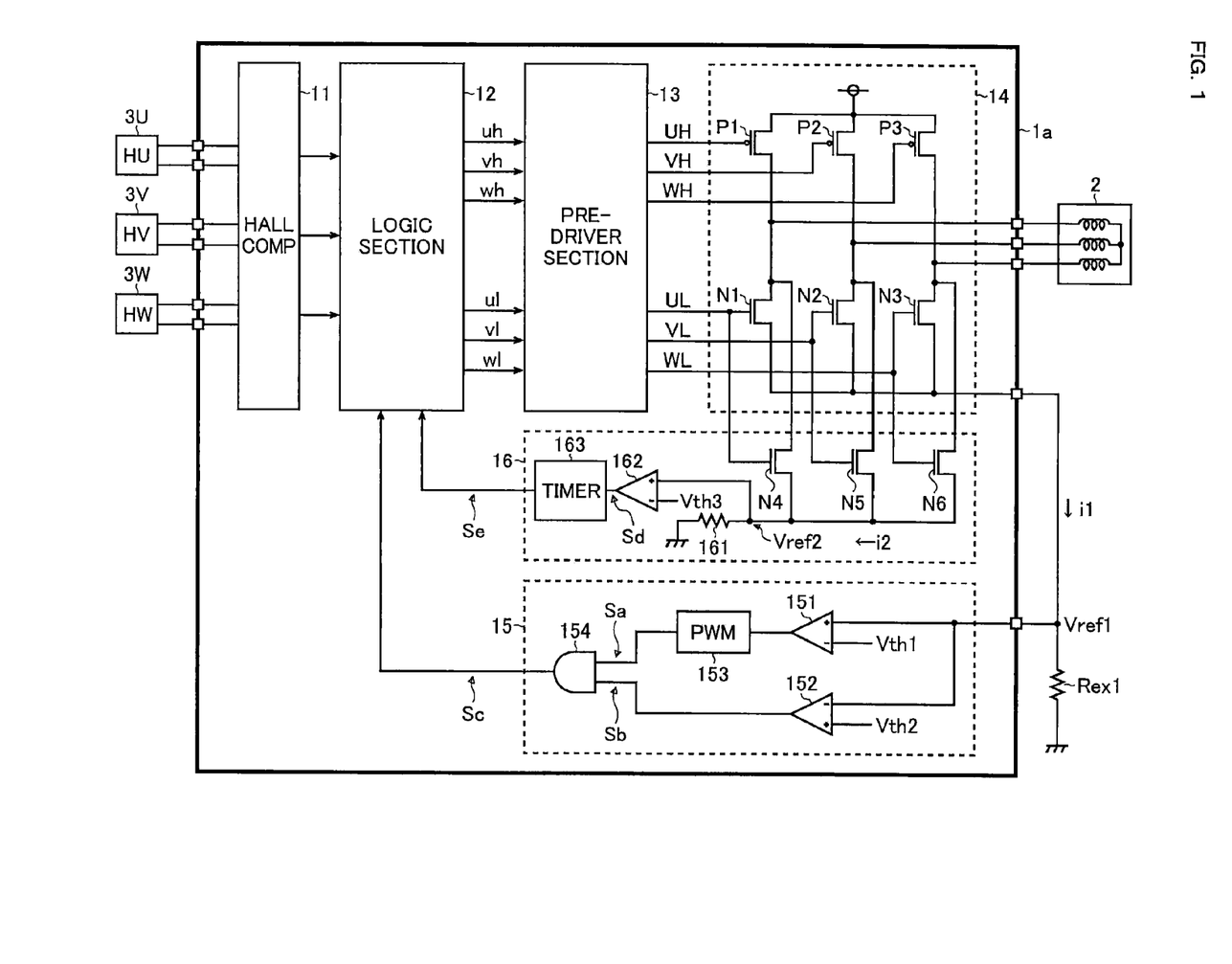
[FIG. 1] A block diagram showing a motor drive device as a first embodiment of the invention.

FIG. 1 is a block diagram (partly a circuit diagram) showing a motor drive device as a first embodiment of the invention.

As shown in FIG. 1, the motor drive device 1a of this embodiment is a semiconductor integrated circuit device that has integrated into it a Hall comparator 11, a logic section 12, a pre-driver section 13, a driver section 14, a constant-current chopping section 15 and an overcurrent protection section 16. Externally connected to the motor drive device 1a are: a motor 2 as the target of driving; Hall sensors 3U, 3V and 3W attached to coils of different phases (U, V and W phases) of the motor 2; and a sense resistor Rex 1 (in this embodiment, with a resistance of about 0.25 Ω) for sensing the drive current i1 flowing in a ground line side of the driver section 14.

The Hall comparator 11 serves as means for comparing sinusoidal hall signals (+/−) of the individual phases fed from the Hall sensors 3U, 3V and 3W with one another to generate and feed rectangular output signals of the individual phases to the logic section 12.

The logic section 12 serves as means for controlling the overall operation of the device (specifically, among others, constant-speed drive control and phase control of the motor 2 based on the output signals of the individual phases from the Hall comparator 11, and also constant-current chopping drive control and overcurrent protection control, both of which will be described later). More specifically, to achieve the constant-speed drive control and phase control of the motor 2, based on the output signals of the individual phases from the Hall comparator 11, the logic section 12 generates and feeds pre-drive signals (uh, ul, vh, vl, wh and wl) of the individual phases of the motor to the pre-driver section 13, while controlling the rotation speed and phase of the motor through feedback control.

The pre-driver section 13 serves as means for shifting the levels of and shaping the waveforms of the pre-drive signals (uh, ul, vh, vl, wh and wl) fed from the logic section 12 to generate and feed the drive signals (UH, UL, VH, VL, WH and WL) of the individual phases of the motor to the driver section 14.

The driver section 14 serves as means for turning on and off power transistors (P-channel field-effect transistors P1 to P3 and N-channel field-effect transistors N1 to N3) connected in an H-bridge configuration to drive the motor 2. The transistors P1 to P3 are switching devices located in an high-side portion of the H-bridge configuration; the transistors N1 to N3 are switching devices located in a low-side portion of the H-bridge configuration.

The sources of the transistors P1 to P3 are connected together to a power line; the sources of the transistors N1 to N3 are connected together to one end of the sense resistor Rex 1. The other end of the sense resistor Rex 1 is connected to a ground line. The drains of the transistors P1 to P3 are connected to the drains of the transistors N1 to N3 on a phase-by-phase basis. Their nodes are connected to one ends of the coils of the respective phases of the motor 2. The power transistors connected in an H-bridge configuration are turned on and off according to the drive signals (UH, UL, VH, VL, WH and WL) fed to their respective gates, and this drives the motor 2. Here, a current i1 flows through the sense resistor Rex 1 to generate, at one end thereof, a first reference voltage Vref1 whose voltage level varies with the current i1.

In the motor drive device 1a of this embodiment, during normal operation, a current i1 of 1 to 3 A flows through the sense resistor Rex1, and thus the voltage level of the first reference voltage Vref1 usually varies between approximately 0.25 and 0.75 V.

The constant-current chopping section 15 is composed of comparators 151 and 152, a chopping signal generating circuit 153 and an AND circuit 154.

The comparator 151 shifts its output logic level according to which of the first reference voltage Vref1 applied to its non-inverting input terminal (+) and a first threshold voltage Vth1 applied to its inverting input terminal (−) is higher. Specifically, when the first reference voltage Vref1 is higher than the first threshold voltage Vth1, the comparator 151 outputs a high-level signal; when the first reference voltage Vref1 is lower than the first threshold voltage Vth1, the comparator 151 outputs a low-level signal. The output signal of the comparator 151 serves as a signal to instruct the chopping signal generating circuit 153 whether to operate (that is, to instruct it whether to perform constant-current chopping). Thus, the first threshold voltage Vth1 is appropriately set in consideration of the normal voltage range (0.25 to 0.75 V) of the first reference voltage Vref1. In this embodiment, the first threshold voltage Vth1 is set at 0.275 V (which corresponds to 1.1 A if given as a first threshold value of the current i1 flowing through the switching devices in the driver section 14).

The chopping signal generating circuit 153 serves as means for generating, when the output logic level of the comparator 151 is high, a first chopping signal (a PWM, or pulse width modulation, signal) Sa for chopping the on-period of the transistors N1 to N3.

The comparator 152 shifts its output logic level according to which of the first reference voltage Vref1 applied to its inverting input terminal (−) and a second threshold voltage Vth2 applied to its non-inverting input terminal (+) is higher. Specifically, when the first reference voltage Vref1 is higher than the second threshold voltage Vth2, the comparator 152 outputs a low-level signal; when the first reference voltage Vref1 is lower than the second threshold voltage Vth2, the comparator 152 outputs a high-level signal. The output signal of the comparator 152 serves as an enable signal Sb to determine whether to enable or disable the first chopping signal Sa. Thus, the second threshold voltage Vth2 is appropriately set to fall outside the normal voltage range of the first reference voltage Vref1 (that is, to fall in a voltage range where there is a risk of overcurrent and therefore constant-current chopping should be stopped so as not to hamper the operation of the overcurrent protection section 16). In this embodiment, the second threshold voltage Vth2 is set at 1.2 V (which corresponds to 4.8 A if given as a second threshold value of the current i1 flowing through the switching devices in the driver section 14).

The AND circuit 154 serves as means for performing an AND operation between the first chopping signal Sa and an interruption signal Sb to feed its output signal as a second chopping signal Sc to the logic section 12. Specifically, when the first reference voltage Vref1 is lower than the second threshold voltage Vth2, the AND circuit 154 outputs the first chopping signal Sa unchanged; when the first reference voltage Vref1 is higher than the second threshold voltage Vth2, the AND circuit 154 outputs a low-level signal irrespective of the level of the first chopping signal Sa.

The overcurrent protection section 16 is composed of N-channel field-effect transistors N4 to N6, a sense resistor 161, a comparator 162 and a timer circuit 163.

The transistors N4 to N6 are switching devices that are controlled in synchronism with the transistors N1 to N3. The drains and gates of the transistors N4 to N6 are connected to the drains and gates of the transistors N1 to N3 respectively. The sources of the transistors N4 to N6 are connected together to one end of the sense resistor 161. The other end of the sense resistor 161 is connected to the ground line. Thus, during the on-period of the transistors N4 to N6, a monitoring current i2 behaving similarly to the current i1 flows through the sense resistor 161. The area of each gate of the transistors N4 to N6 is set to be one-nth (in this embodiment, one-thousandth) that of the transistors N1 to N3, and thus the monitoring current i2 is one-nth the current i1.

The sense resistor 161 is a resistive element (in this embodiment, with a resistance of about 10 Ω) through which the monitoring current i2 flows. At one end of the sense resistor 161, a second reference voltage Vref2 is generated whose voltage level varies according to the monitoring current i2. In the motor drive device 1a of this embodiment, during normal operation, a monitoring current i2 of 0.001 to 0.003 A (one-thousandth of the current i1) flows through the sense resistor 161, and thus the voltage level of the second reference voltage Vref2 usually varies between approximately 0.01 and 0.03 V.

The comparator 162 shifts its output logic level according to which of the second reference voltage Vref2 applied to its non-inverting input terminal (+) and a third threshold voltage Vth3 applied to its inverting input terminal (−) is higher. Specifically, when the second reference voltage Vref2 is higher than the third threshold voltage Vth3, the comparator 162 outputs a high-level signal; when the second reference voltage Vref2 is lower than the third threshold voltage Vth3, the comparator 162 outputs a low-level signal. The output signal of the comparator 162 serves as a trigger signal Sd that instructs the timer circuit 163 to start counting (i.e., that indicates the starting point of continuous overcurrent). Thus, the third threshold voltage Vth3 is appropriately set to fall outside the normal voltage range of the second reference voltage Vref2 (i.e., to fall in a voltage range where overcurrent protection should be performed). In this embodiment, the third threshold voltage Vth3 is set at 0.048 V (which corresponds to 4.8 A if given as a third threshold value of the current i1 flowing through the switching devices in the driver section 14).

The timer circuit 163 (serving as enabling-limiting means) starts counting a predetermined mask period T when triggered by the trigger signal Sd getting enabled (turned high); thereafter, when the duration for which the trigger signal Sd has remained enabled reaches the mask period T, the timer circuit 163 latches its output logic level in an enabled (high-level) state. The output signal of the timer circuit 163 is fed to the logic section 12 to serve as an overcurrent protection signal Se (a signal that gets enabled only when the trigger signal Sd has remained enabled for the mask period T) for latching in an off state the switching devices in the driver section 14.

Next, with reference to FIG. 2, a detailed description will be given of how the motor drive device 1a configured as described above performs constant-current chopping and overcurrent protection.

When the current i1 flowing through the switching devices in the driver section 14 is below the first threshold value (in this embodiment, 1.1 A), the inequality "Vref1<Vth1, Vth2" holds, and the inequality "Vref2<Vth3" holds ((X) in FIG. 2). Hence, the first chopping signal Sa is low and the interruption signal Sb is high, and thus the second chopping signal Sc is kept low. The trigger signal Sd is low, and thus the overcurrent protection signal Se is kept low. Here, since the second chopping signal Sc and the overcurrent protection signal Se are both low, the logic section 12 recognizes that neither constant-current chopping nor overcurrent protection needs to be performed. Consequently, normal drive signals (UH, UL, VH, VL, WH and WL) are fed to the switching devices in the driver section 14.

When the current i1 is equal to or above the first threshold value but below the second and third threshold values (in this embodiment, both 4.8 A), the inequality "Vth1<Vref1<Vth2" holds, and the inequality "Vref2<Vth3" holds ((Y) in FIG. 2). Hence, the first chopping signal Sa starts to be PWM-driven, while the interruption signal Sb continues to be high. Thus, the first chopping signal Sa is, without being interrupted by the AND circuit 154, fed as the second chopping signal Sc to the logic section 12. Here, as the second chopping signal Sc is PWM-driven, the logic section 12 generates pre-drive signals (ul, vl and wl) for the low side of the individual phases to chop the on-period of the transistors N1 to N3. Consequently, PWM-driven signals (UL, VL and WL) are fed to the transistors N1 to N3 so that normal constant-current chopping is performed. So long as the current i1 is below the third threshold value, the inequality "Vref2<Vth3" holds as described above, and thus the trigger signal Sd and the overcurrent protection signal Se continue to be low. Hence, since the overcurrent protection signal Se is low, the logic section 12 recognizes that overcurrent protection is unnecessary.

Figure 2:
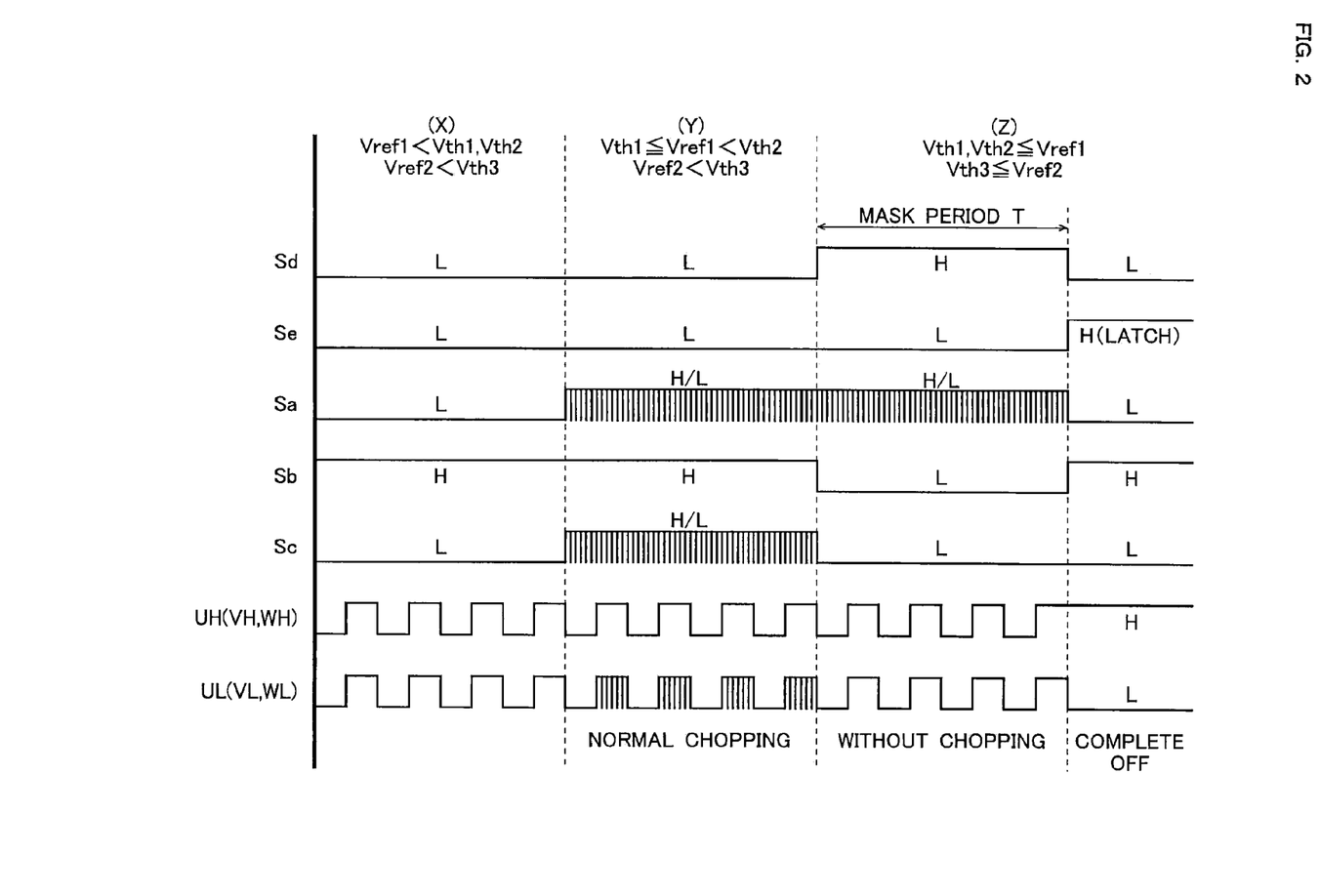
[FIG. 2] A diagram illustrating how the motor drive device 1a performs constant-current chopping and overcurrent protection.

When the current i1 reaches the second and third threshold values, the inequality "Vth1, Vth2≦Vref1" holds, and the inequality "Vth3≦Vref2" holds ((Z) in FIG. 2). Hence, while the first chopping signal Sa continues to be PWM-driven, the interruption signal Sb turns from high to low in its logic level. Thus, the first chopping signal Sa is interrupted by the AND circuit 154, and now a low-level signal is fed as the second chopping signal Sc to the logic section 12. Consequently, constant-current chopping is forcibly terminated, and thus the normal drive signals (UH, UL, VH, VL, WH and WL) are fed to the switching devices in the driver section 14.

When the current i1 reaches the third threshold value, the inequality "Vth3≦Vref2" holds as described above, and thus the trigger signal Sd turns high. Hence, triggered by the trigger signal Sd getting enabled (turned high), the timer circuit 163 starts to count; thereafter, when the duration for which the trigger signal Sd has remained enabled reaches the predetermined mask period T, the overcurrent protection signal Se is latched in an enabled (high-level) state. Here, since the overcurrent protection signal Se is in an enabled state, the logic section 12 recognizes the occurrence of overcurrent, and thus generates the pre-drive signals (uh, ul, vh, vl, wh and wl) of the individual phases to stop the driving of the motor 2. Consequently, now, the drive signals (UH, VH and WH) fed to the transistors P1 to P3 are all high; the drive signals (UL, VL and WL) fed to the transistors N1 to N3 are all low. Thus, the switching devices in the driver section 14 are all latched in an off state to stop the driving of the motor 2 completely.

In the motor drive device 1a of this embodiment, during the period after the current i1 flowing through the switching devices in the driver section 14 reaches the second and third threshold values until overcurrent protection is initiated, that is, during the mask period T, overcurrent continues to flow into the switching devices in the driver section 14 while no constant-current chopping is performed. Thus, the length of the mask period T should be set appropriately (at about several hundred nanoseconds to several microseconds; in this embodiment, three microseconds) so that it is long enough to ignore unnecessary noise and thereby avoid false detection of overcurrent but short enough to prevent the switching devices from being destroyed by the overcurrent flowing thereinto during the counting of the mask period T.

As described above, the motor drive device 1a of this embodiment includes: the chopping signal generating means 151 and 153 for generating, when the current i1 flowing through the switching devices in the driver section 14 reaches the first threshold value (a threshold value set by the first threshold voltage Vth1), the first chopping signal Sa for chopping the on-period of the switching devices; the chopping signal interrupting means 152 and 154 for interrupting the first chopping signal Sa when the current i1 flowing through the switching devices reaches the second threshold value (a threshold value set by the second threshold voltage Vth2) greater than the first threshold value; and the overcurrent protection section 16 for generating, when the current i1 flowing through the switching devices reaches the third threshold value (a threshold value set by the third threshold voltage Vth3) greater than the first threshold value and thereafter remains equal to the third threshold value for a duration equal to the predetermined mask period T, the overcurrent protection signal Se for latching the switching devices in an off state.

With this configuration, in the event of continuous overcurrent in the driver section 14, constant-current chopping can be forcibly terminated. Hence, constant-current chopping is prevented from breaking the continuity of the overcurrent, thus allowing overcurrent detection in the overcurrent protection section 16, and hence overcurrent protection, to be performed successfully.

Hence, the motor drive device 1a of this embodiment, as opposed to one having the conventional configuration, does not allow constant-current chopping to continue in an overcurrent condition. Thus, even when transistors with low resistance to breakdown are used as switching devices in the driver section 14, they can be effectively prevented from breaking down.

That is, with the motor drive device 1a of this embodiment, it is possible to make full use of both the constant-current chopping and overcurrent protection capabilities without giving any consideration to their mutual interference, thus achieving improved reliability and safety of the device.

In the motor drive device 1a of this embodiment, the second and third threshold values set by the second and third threshold voltages Vth2 and Vth3 respectively are set equal to each other. With this setting, ideally, the termination of the constant-current chopping and the starting of the overcurrent detection (that is, the starting of the counting of the mask period T) are triggered simultaneously. In this way, the period during which the constant-current chopping and overcurrent protection capabilities interfere with each other is minimized, thus achieving improved reliability and safety of the device.

The motor drive device 1a of this embodiment includes means for generating, in separate systems, the first and second reference voltages Vref1 and Vref2 whose voltage levels vary according to the current i1 (or its monitoring current i2) flowing through the switching devices in the driver section 14 so that, while the constant-current chopping section 15 (the chopping signal generating means and the chopping signal interrupting means) generates and interrupts the first chopping signal Sa based on the first reference voltage Vref1, the overcurrent protection section 16 generates the overcurrent protection signal Se based on the second reference voltage Vref2.

With this configuration, it is possible to prevent malfunctioning resulting from the false detection of overcurrent. In particular, with the configuration in which the second reference voltage Vref2 referred to by the overcurrent protection section 16 is generated by the sense resistor 161 inside the device, even if the sense resistor Rex1 outside the device has poor contact, is short-circuited, or otherwise fails and thus the first reference voltage Vref1 cannot be properly generated, overcurrent protection (the latching of the switching devices in an off state in the event of overcurrent) can be performed successfully. This helps achieve improved reliability and safety of the device.

Although the embodiment described above deals with an example where the present invention is applied to a motor drive device for controlling the driving of a three-phase fullwave motor, application of the invention is not limited to such motor drive devices. The invention finds wide application in motor drive devices for driving any other type of motor (such as DC motors and stepping motors) and in electric devices incorporating such a motor drive device.

Otherwise than specifically described by way of an embodiment above, many modifications and variations are possible without departing from the sprit of the invention.

For example, although the embodiment described above deals with an example where the constant-current chopping and overcurrent protection capabilities are realized by detecting the current flowing in the ground line side of the driver section 14, the invention is not limited to such a configuration. These capabilities may be realized by detecting the current flowing in the power line side of the driver section 14.

Figure 3:
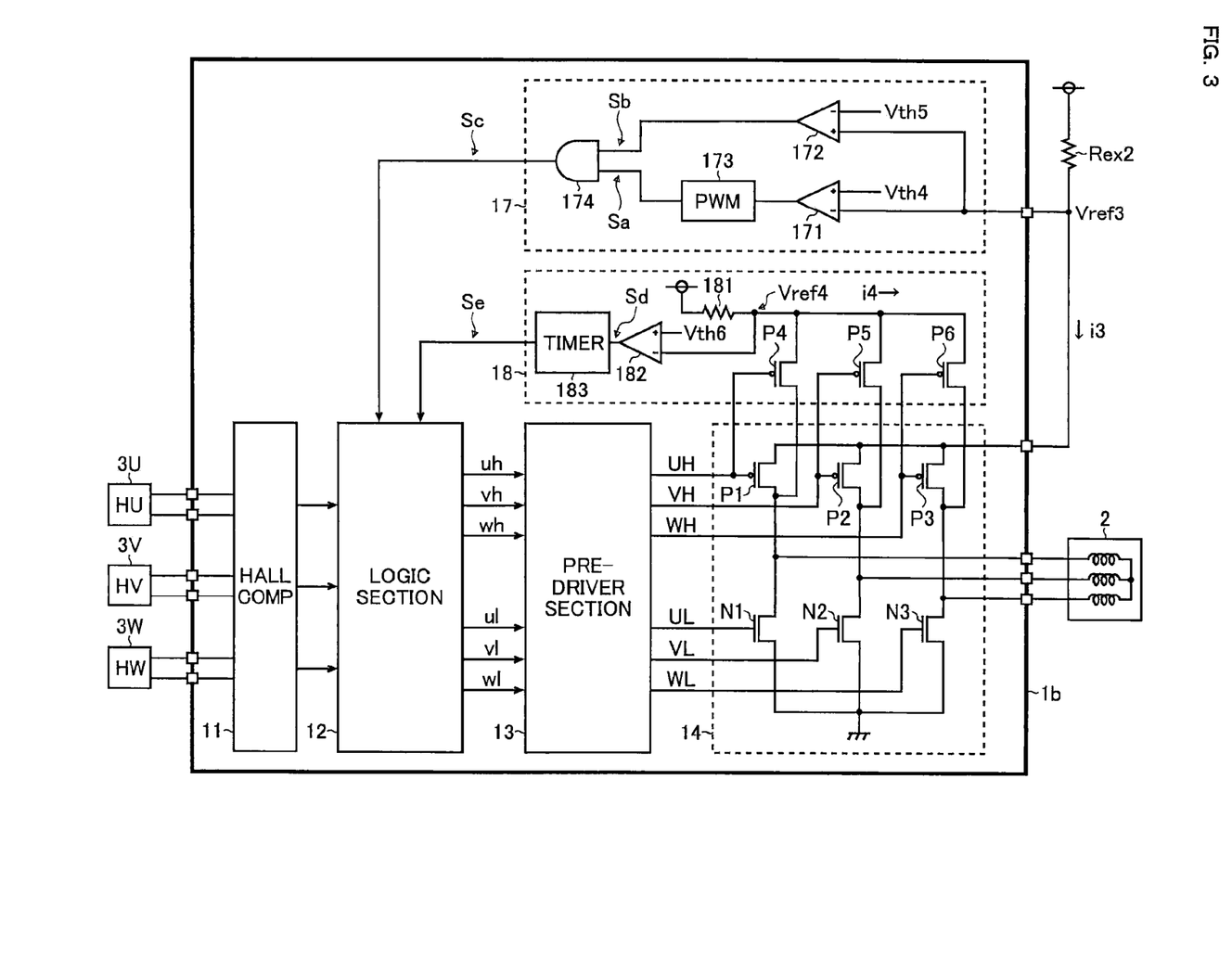
[FIG. 3] A block diagram showing a motor drive device as a second embodiment of the invention.

FIG. 3 is a block diagram (partly a circuit diagram) showing a motor drive device as a second embodiment of the invention. Such parts as are found also in the first embodiment are identified with common reference numerals, and no detailed description thereof will be repeated.

As shown in FIG. 3, the motor drive device 1b of this embodiment is composed of: a constant-current chopping section 17 that realizes the constant-current chopping capability by detecting a drive current i3 flowing in the power line side of the driver section 14; and an overcurrent protection section 18 that realizes the overcurrent protection capability by detecting a monitoring current i4 of the drive current i3. Externally connected to the motor drive device 1b is a sense resistor Rex2 (in this embodiment, with a resistance of about 0.25 Ω) for sensing the drive current i3 flowing in the power line side of the driver section 14.

The sources of the transistors P1 to P3 of the driver section 14 are connected together to one end of the sense resistor Rex2. The other end of the sense resistor Rex2 is connected to the power line. The sources of the transistors N1 to N3 are connected together to the ground line. The drains of the transistors P1 to P3 are connected to the drains of the transistors N1 to N3 on a phase-by-phase basis. Their nodes are connected to one ends of the coils of the respective phases of the motor 2. The power transistors connected in an H-bridge configuration are turned on and off according to drive signals (UH, UL, VH, VL, WH and WL) fed to their respective gates, and this drives the motor 2. Here, the current i3 flows through the sense resistor Rex2 to generate, at one end thereof, a third reference voltage Vref3 whose voltage level varies with the current i3.

In the motor drive device 1b of this embodiment, during normal operation, the current i3 of 1 to 3 A flows through the sense resistor Rex2, and thus the voltage level of the third reference voltage Vref3 usually varies between approximately (Vcc-0.25) and (Vcc-0.75) V.

The constant-current chopping section 17 is composed of comparators 171 and 172, a chopping signal generating circuit 173 and an AND circuit 174.

The comparator 171 shifts its output logic level according to which of the third reference voltage Vref3 applied to its inverting input terminal (−) and a fourth threshold voltage Vth4 applied to its non-inverting input terminal (+) is higher. Specifically, when the third reference voltage Vref3 is higher than the fourth threshold voltage Vth4, the comparator 171 outputs a low-level signal; when third reference voltage Vref3 is lower than the fourth threshold voltage Vth4, the comparator 171 outputs a high-level signal. The output signal of the comparator 171 serves as a signal to instruct the chopping signal generating circuit 173 whether to operate (that is, to instruct it whether to perform the constant-current chopping). Thus, the fourth threshold voltage Vth4 is appropriately set in consideration of the normal voltage range ((Vcc-0.25) to (Vcc-0.75) V) of the third reference voltage Vref3. In this embodiment, the fourth threshold voltage Vth4 is set at (Vcc-0.275) V (which corresponds to 1.1 A if given as a first threshold value of the current i3 flowing through the switching devices in the driver section 14).

The chopping signal generating circuit 173 serves as means for generating, when the output logic level of the comparator 171 is high, a first chopping signal (a PWM, or pulse width modulation, signal) Sa for chopping the on-period of the transistors P1 to P3.

The comparator 172 shifts its output logic level according to which of the third reference voltage Vref3 applied to its non-inverting input terminal (+) and a fifth threshold voltage Vth5 applied to its inverting input terminal (−) is higher. Specifically, when the third reference voltage Vref3 is higher than the fifth threshold voltage Vth5, the comparator 172 outputs a high-level signal; when the third reference voltage Vref3 is lower than the fifth threshold voltage Vth5, the comparator 172 outputs a low-level signal. The output signal of the comparator 172 serves as an enable signal Sb to determine whether to enable or disable the first chopping signal Sa. Thus, the fifth threshold voltage Vth5 is appropriately set to fall outside the normal voltage range of the third reference voltage Vref3 (that is, to fall in a voltage range where there is a risk of overcurrent and therefore constant-current chopping should be stopped so as not to hamper the operation of the overcurrent protection section 18). In this embodiment, the fifth threshold voltage Vth5 is set at (Vcc-1.2) V (which corresponds to 4.8 A if given as a second threshold value of the current i3 flowing through the switching devices in the driver section 14).

The AND circuit 174 serves as means for performing an AND operation between the first chopping signal Sa and the interruption signal Sb to feed its output signal as a second chopping signal Sc to the logic section 12. Specifically, when the third reference voltage Vref3 is higher than the fifth threshold voltage Vth5, the AND circuit 174 outputs the first chopping signal Sa unchanged; when the third reference voltage Vref3 is lower than the fifth threshold voltage Vth5, the AND circuit 174 outputs a low-level signal irrespective of the level of the first chopping signal Sa.

The overcurrent protection section 18 is composed of P-channel field-effect transistors P4 to P6, a sense resistor 181, a comparator 182 and a timer circuit 183.

The transistors P4 to P6 are switching devices that are controlled in synchronism with the transistors P1 to P3. The drains and gates of the transistors P4 to P6 are connected to the drains and gates of the transistors P1 to P3 respectively.

The sources of the transistors P4 to P6 are connected together to one end of the sense resistor 181. The other end of the sense resistor 181 is connected to the power line. Thus, during the on-period of the transistors P4 to P6, a monitoring current i4 behaving similarly to the current i3 flows through the sense resistor 181. The area of each gate of the transistors P4 to P6 is set to be one-nth (in this embodiment, one-thousandth) that of the transistors P1 to P3, and thus the monitoring current i4 is one-nth the current i3.

The sense resistor 181 is a resistive element (in this embodiment, with a resistance of about 10 Ω) through which the monitoring current i4 flows. At one end of the sense resistor 181, a fourth reference voltage Vref4 is generated whose voltage level varies according to the monitoring current i4. In the motor drive device 1b of this embodiment, during normal operation, a monitoring current i4 of 0.001 to 0.003 A (one-thousandth of the current i3) flows through the sense resistor 181, and thus the voltage level of the fourth reference voltage Vref4 usually varies between approximately (Vcc-0.01) to (Vcc-0.03) V.

The comparator 182 shifts its output logic level according to which of the fourth reference voltage Vref4 applied to its inverting input terminal (−) and a sixth threshold voltage Vth6 applied to its non-inverting input terminal (+) is higher. Specifically, when the fourth reference voltage Vref4 is higher than the sixth threshold voltage Vth6, the comparator 182 outputs a low-level signal; when the fourth reference voltage Vref4 is lower than the sixth threshold voltage Vth6, the comparator 182 outputs a high-level signal. The output signal of the comparator 182 serves as a trigger signal Sd that instructs the timer circuit 183 to start counting (i.e., that indicates the starting point of continuous overcurrent). Thus, the sixth threshold voltage Vth6 is appropriately set to fall outside the normal voltage range of the fourth reference voltage Vref4 (i.e., in a voltage range where overcurrent protection should be performed). In this embodiment, the sixth threshold voltage Vth6 is set at (Vcc-0.048) V (which corresponds to 4.8 A if given as a third threshold value of the current i3 flowing through the switching devices in the driver section 14).

The timer circuit 183 (serving as enabling-limiting means) starts counting a predetermined mask period T when triggered by the trigger signal Sd getting enabled (turned high); thereafter, when the duration for which the trigger signal Sd has remained enabled reaches the mask period T, the timer circuit 183 latches its output logic level in an enabled (high-level) state. The output signal of the timer circuit 183 is fed to the logic section 12 to serve as an overcurrent protection signal Se (a signal that gets enabled only when the trigger signal Sd has remained enabled for the mask period T) for latching in an off state the switching devices in the driver section 14.

Next, with reference to FIG. 4, a detailed description will be given of how the motor drive device 1b configured as described above performs constant-current chopping and overcurrent protection.

When the current i3 flowing through the switching devices in the driver section 14 is below the first threshold value (in this embodiment, 1.1 A), the inequality of "Vth4, Vth5<Vref3" holds, and the inequality of "Vth6<Vref4" holds ((X) in FIG. 4). Hence, the first chopping signal Sa is low and the interruption signal Sb is high, and thus the second chopping signal Sc is kept low. The trigger signal Sd is low, and thus the overcurrent protection signal Se is kept low. Here, since the second chopping signal Sc and the overcurrent protection signal Se are both low, the logic section 12 recognizes that neither constant-current chopping nor overcurrent protection needs to be performed. Consequently, normal drive signals (UH, UL, VH, VL, WH and WL) are fed to the switching devices in the driver section 14.

When the current i3 is equal to or above the first threshold value but below the second and third threshold values (in this embodiment, both 4.8 A), the inequality "Vth5≦Vref3<Vth4" holds, and the inequality "Vth6<Vref4" holds ((Y) in FIG. 4). Hence, the first chopping signal Sa starts to be PWM-driven, while the interruption signal Sb continues to be high. Thus, the first chopping signal Sa is, without being interrupted by the AND circuit 174, fed as the second chopping signal Sc to the logic section 12. Here, as the second chopping signal Sc is PWM-driven, the logic section 12 generates pre-drive signals (uh, vh and wh) for the high-side of the individual phases to chop the on-period of the transistors P1 to P3. Consequently, PWM-driven signals (UH, VH and WH) are fed to the transistors P1 to P3 so that normal constant-current chopping is performed. So long as the current i3 is below the third threshold value, the inequality "Vth6<Vref4" holds as described above, and thus the trigger signal Sd and the overcurrent protection signal Se continue to be low. Hence, since the overcurrent protection signal Se is low, the logic section 12 recognizes that the overcurrent protection is unnecessary.

Figure 4:
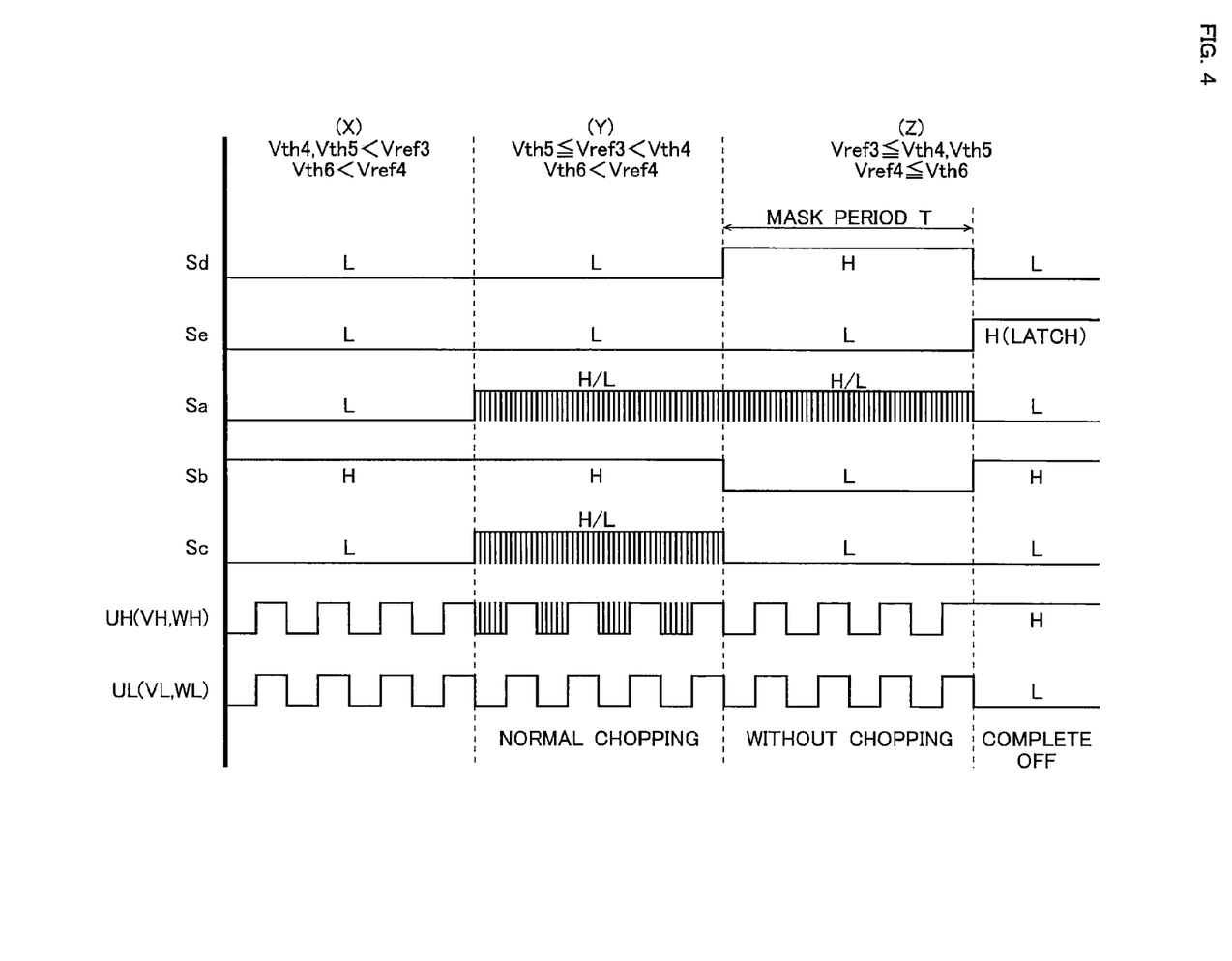
[FIG. 4] A diagram illustrating how the motor drive device 1b performs constant-current chopping and overcurrent protection.

When the current i3 reaches the second and third threshold values, the inequality "Vref3≦Vth4, Vth5" holds, and the inequality "Vref4≦Vth6" holds ((Z) in FIG. 4). Hence, while the first chopping signal Sa continues to be PWM-driven, the interruption signal Sb turns from high to low in its logic level. Thus, the first chopping signal Sa is interrupted by the AND circuit 174, and now a low-level signal is fed as the second chopping signal Sc to the logic section 12. Consequently, constant-current chopping is forcibly terminated, and thus the normal drive signals (UH, UL, VH, VL, WH and WL) are fed to the switching devices in the driver section 14.

When the current i3 reaches the third threshold value, the inequality "Vref4≦Vth6" holds as described above, and thus the trigger signal Sd turns high. Hence, triggered by the trigger signal Sd getting enabled (turned high), the timer circuit 183 starts to count; thereafter, when the duration for which the trigger signal Sd has remained enabled reaches the predetermined mask period T, the overcurrent protection signal Se is latched in an enabled (high-level) state. Here, since the overcurrent protection signal Se is in an enabled state, the logic section 12 recognizes the occurrence of overcurrent, and thus generates the pre-drive signals (uh, ul, vh, vl, wh and wl) of the individual phases to stop the driving of the motor 2. Consequently, now the drive signals (UH, VH and WH) fed to the transistors P1 to P3 are all high; the drive signals (UL, VL and WL) fed to the transistors N1 to N3 are all low. Thus, the switching devices in the driver section 14 are all latched in an off state to stop the driving of the motor 2 completely.

In the motor drive device 1b of this embodiment, during the period after the current i3 flowing through the switching devices in the driver section 14 reaches the second and third threshold values until overcurrent protection is initiated, that is, during the mask period T, overcurrent continues to flow into the switching devices in the driver section 14 while no constant-current chopping is performed. Thus, the length of the mask period T should be set appropriately (at about several hundred nanoseconds to several microseconds; in this embodiment, three microseconds) so that it is long enough to ignore unnecessary noise and thereby avoid false detection of overcurrent but short enough to prevent the switching devices from being destroyed by the overcurrent flowing thereinto during the counting of the mask period T.

As described above, the motor drive device 1b of this embodiment includes: the chopping signal generating means 171 and 173 for generating, when the current i3 flowing through the switching devices in the driver section 14 reaches the first threshold value (a threshold value set by the fourth threshold voltage Vth4), the first chopping signal Sa for chopping the on-period of the switching devices; the chopping signal interrupting means 172 and 174 for interrupting the first chopping signal Sa when the current i3 flowing through the switching devices reaches the second threshold value (a threshold value set by the fifth threshold voltage Vth5) greater than the first threshold value; and the overcurrent protection section 18 for generating, when the current i3 flowing through the switching devices reaches the third threshold value (a threshold value set by the sixth threshold voltage Vth6) greater than the first threshold value and thereafter remains equal to the third threshold value for a duration equal to the predetermined mask period T, the overcurrent protection signal Se for latching the switching devices in an off state.

With this configuration, in the event of continuous overcurrent in the driver section 14, constant-current chopping can be forcibly terminated. Hence, constant-current chopping is prevented from breaking the continuity of the overcurrent, thus allowing overcurrent detection in the overcurrent protection section 18, and hence overcurrent protection, to be performed successfully.

Hence, the motor drive device 1b of this embodiment, as opposed to one having the conventional configuration, does not allow constant-current chopping to continue in an overcurrent condition. Thus, even when transistors with low resistance to breakdown are used as switching devices in the driver section 14, they can be effectively prevented from breaking down.

That is, with the motor drive device 1b of this embodiment, it is possible to makes full use of both the constant-current chopping and overcurrent protection capabilities without giving any consideration to their mutual interference, thus achieving improved reliability and safety of the device.

In the motor drive device 1b of this embodiment, the second and third threshold values set by the fifth and sixth threshold voltages Vth5 and Vth6 respectively are set equal to each other. With this setting, ideally, the termination of the constant-current chopping and the starting of the overcurrent detection (that is, the starting of the counting of the mask period T) are triggered simultaneously. In this way, the period during which the constant-current chopping and overcurrent protection capabilities interfere with each other is minimized, thus achieving improved reliability and safety of the device.

The motor drive device 1b of this embodiment includes means for generating, in separate systems, the third and fourth reference voltages Vref3 and Vref4 whose voltage levels vary according to the current i3 (or its monitoring current i4) flowing through the switching devices in the driver section 14 so that, while the constant-current chopping section 17 (the chopping signal generating means and the chopping signal interrupting means) generates and interrupts the first chopping signal Sa based on the third reference voltage Vref3, the overcurrent protection section 18 generates the overcurrent protection signal Se based on the fourth reference voltage Vref4.

With this configuration, it is possible to prevent malfunctioning resulting from the false detection of overcurrent. In particular, with the configuration in which the fourth reference voltage Vref4 referred to by the overcurrent protection section 18 is generated by the sense resistor 181 inside the device, even if the sense resistor Rex2 outside the device has poor contact, is short-circuited or otherwise fails and thus the third reference voltage Vref3 cannot be properly generated, overcurrent protection (the latching of the switching devices in an off state in the event of overcurrent) can be performed successfully. This helps achieve improved reliability and safety of the device.

Although the first embodiment described above deals with an example where the comparator 152 for comparing the first reference voltage Vref1 with the second threshold voltage Vth2 controls whether to interrupt the first chopping signal Sa, the invention is not limited to this configuration. The capability to interrupt the chopping signal may be achieved based on the result of the overcurrent detection (trigger signal Sd) by the overcurrent protection section 16.

Figure 6:
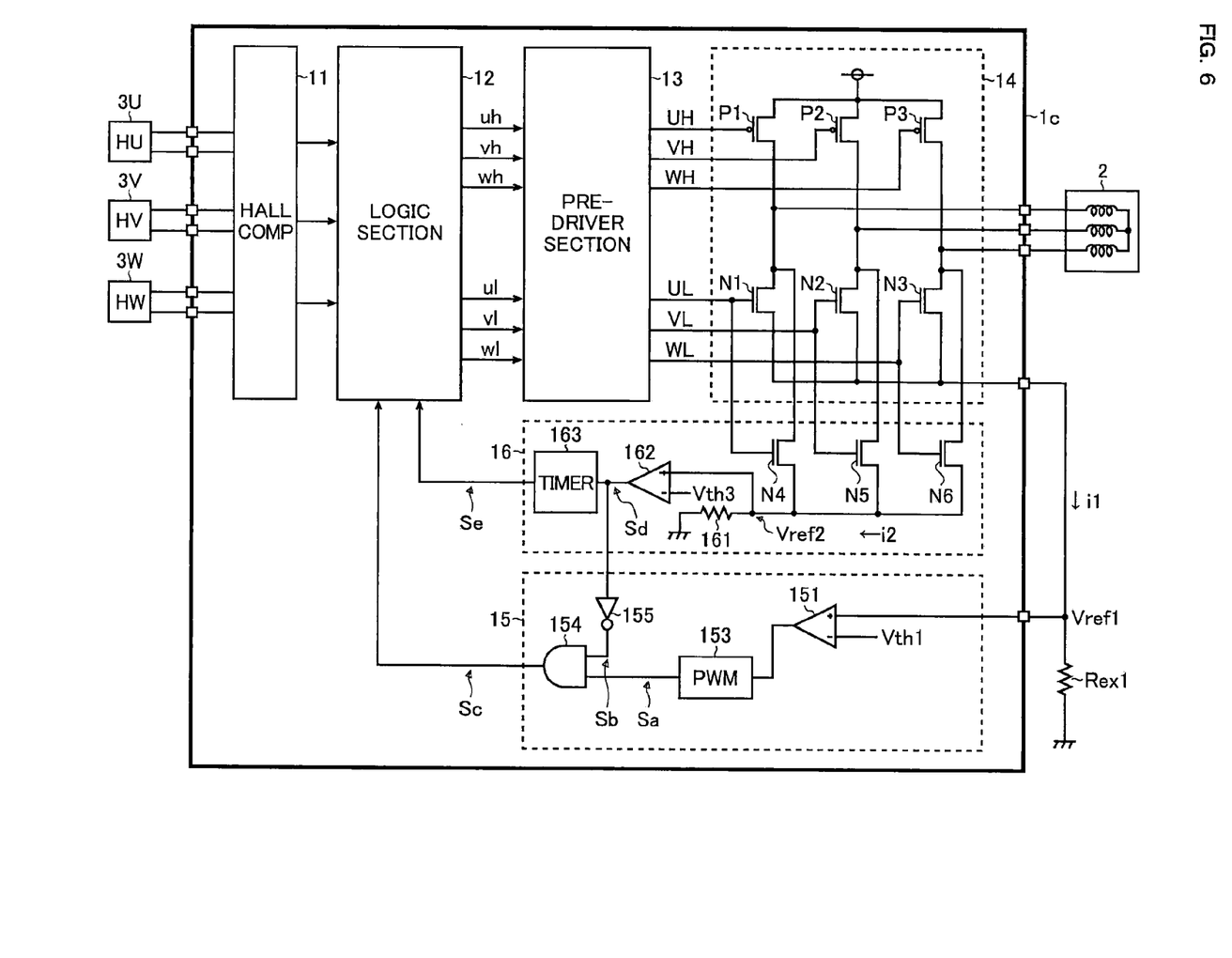
[FIG. 6] A block diagram showing a motor drive device as a third embodiment of the invention.

FIG. 6 is a block diagram (partly a circuit diagram) showing a motor drive device as a third embodiment of the invention. Such parts as are found also in the first embodiment are identified with common reference numerals, and no detailed description thereof will be repeated In the motor drive device 1c of this embodiment, the constant-current chopping section 15 includes, instead of the comparator 152 described previously, an inverter 155 for inverting the trigger signal Sd from the overcurrent protection section 16, the inverter 155 thus serving as means for generating the interruption signal Sb fed to the AND circuit 154.

Specifically, when the second reference voltage Vref2 is higher than the third threshold voltage Vth3 and thus the trigger signal Sd from the overcurrent protection section 16 is high, the inverter 155 outputs a low level as the interruption signal Sb; in contrast, when the second reference voltage Vref2 is lower than the third threshold voltage Vth3 and thus the trigger signal Sd from the overcurrent protection section 16 is low, the inverter 155 outputs a high level as the interruption signal Sb.

The AND circuit 154 serves as means for performing an AND operation between the first chopping signal Sa and the interruption signal Sb to feed its output signal as a second chopping signal Sc to the logic section 12. Specifically, when the second reference voltage Vref2 is lower than the third threshold voltage Vth3, the AND circuit 154 outputs the first chopping signal Sa unchanged; when the second reference voltage Vref2 is higher than the third threshold voltage Vth3, the AND circuit 154 outputs a low-level signal irrespective of the level of the first chopping signal Sa.

Next, with reference to FIG. 7, a detailed description will be given of how the motor drive device 1c configured as described above performs constant-current chopping and overcurrent protection.

When the current i1 flowing through the switching devices in the driver section 14 is below the first threshold value (in this embodiment, 1.1 A), the inequality "Vref1<Vth1" holds, and the inequality "Vref2<Vth3" holds ((X) in FIG. 7). Hence, the first chopping signal Sa and the trigger signal Sd are both low, and thus the interruption signal Sb is high. Thus, the second chopping signal Sc and the overcurrent protection signal Se are both kept low. Here, since the second chopping signal Sc and the overcurrent protection signal Se are both low, the logic section 12 recognizes that neither constant-current chopping nor overcurrent protection needs to be performed. Consequently, normal drive signals (UH, UL, VH, VL, WH and WL) are fed to the switching devices in the driver section 14.

When the current i1 is equal to or above the first threshold value but below the third threshold value (in this embodiment, 4.8 A), the inequality "Vth1≦Vref1" holds, and the inequality "Vref2<Vth3" holds ((Y) in FIG. 7). Hence, the first chopping signal Sa starts to be PWM-driven, while the interruption signal Sb continues to be high. Thus, the first chopping signal Sa is, without being interrupted by the AND circuit 154, fed as the second chopping signal Sc to the logic section 12. Here, as the second chopping signal Sc is PWM-driven, the logic section 12 generates pre-drive signals (ul, vl and wl) for the low-side of the individual phases to chop the on-period of the transistors N1 to N3. Consequently, PWM-driven signals (UL, VL and WL) are fed to the transistors N1 to N3 so that normal constant-current chopping is performed. So long as the current i1 is below the third threshold value, the inequality "Vref2<Vth3" holds as described above, and thus the trigger signal Sd and the overcurrent protection signal Se continue to be low. Hence, since the overcurrent protection signal Se is low, the logic section 12 recognizes that overcurrent protection is unnecessary.

When the current i1 reaches the third threshold value, the inequality

Figure 7:
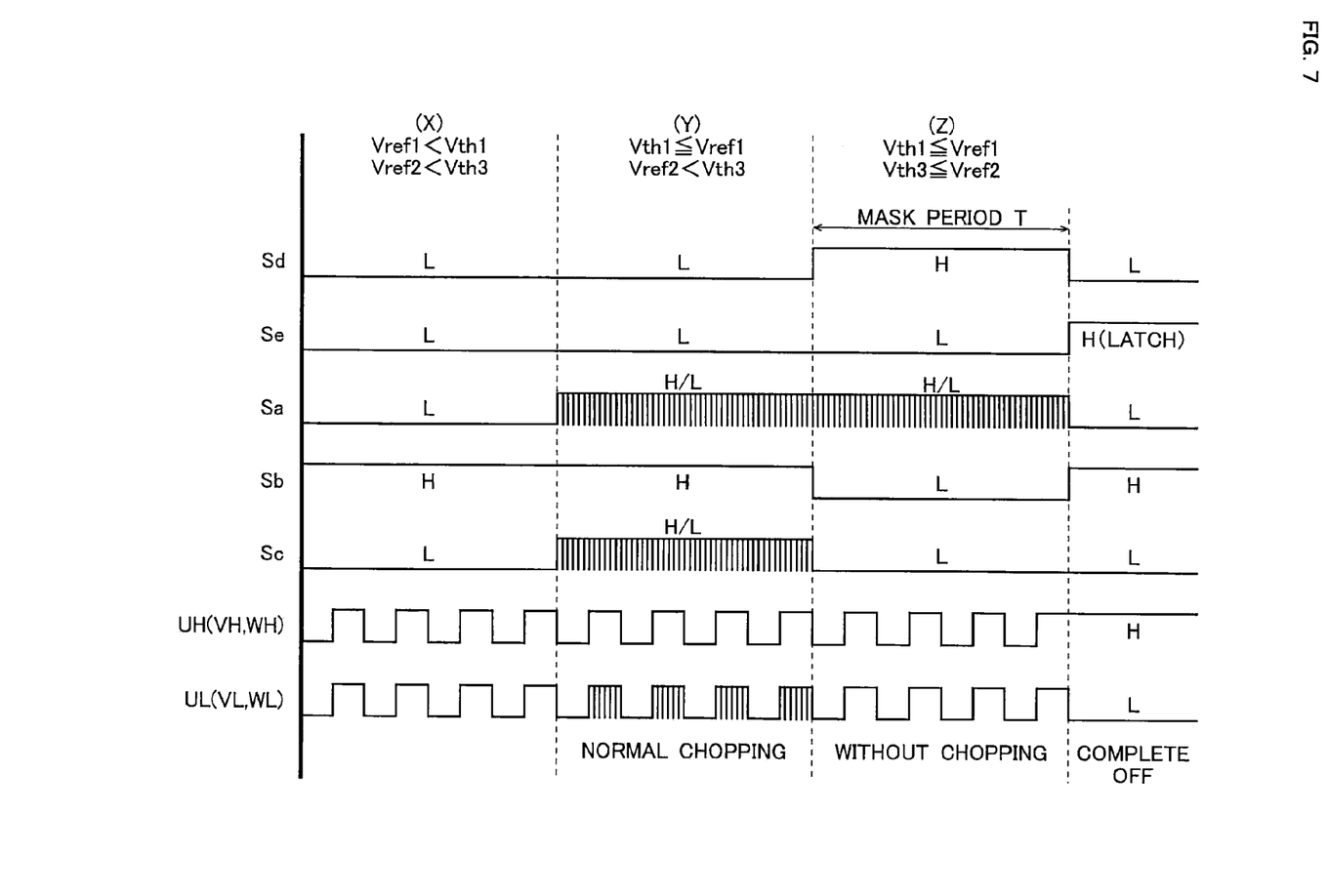
[FIG. 7] A diagram illustrating how the motor drive device 1c performs constant-current chopping and overcurrent protection.

"Vth1≦Vref1" holds, and the inequality "Vth3≦Vref2" holds ((Z) in FIG. 7). Hence, while the first chopping signal Sa continues to be PWM-driven, the interruption signal Sb turns from high to low in its logic level resulting from the trigger signal Sd turning high. Thus, the first chopping signal Sa is interrupted by the AND circuit 154, and now a low-level signal is fed as the second chopping signal Sc to the logic section 12. Consequently, constant-current chopping is forcibly terminated, and thus the normal drive signals (UH, UL, VH, VL, WH and WL) are fed to the switching devices in the driver section 14.

When the current i1 reaches the third threshold value, the inequality

"Vref3≦Vth2" holds as described above, and thus the trigger signal Sd turns high. Hence, triggered by the trigger signal Sd getting enabled (turned high), the timer circuit 163 starts to count; thereafter, when the duration for which the trigger signal Sd has remained enabled reaches the predetermined mask period T, the overcurrent protection signal Se is latched in an enabled (high-level) state. Here, since the overcurrent protection signal Se is in an enabled state, the logic section 12 recognizes the occurrence of overcurrent, and thus generates the pre-drive signals (uh, ul, vh, vl, wh and wl) of the individual phases to stop the driving of the motor 2. Consequently, now the drive signals (UH, VH and WH) fed to the transistors P1 to P3 are all high; the drive signals (UL, VL and WL) fed to the transistors N1 to N3 are all low. Thus, the switching devices in the driver section 14 are all latched in an off state to stop the driving of the motor 2 completely.

In the motor drive device 1c of this embodiment, during the period after the current i1 flowing through the switching devices in the driver section 14 reaches the third threshold value until the overcurrent protection is initiated, that is, during the mask period T, overcurrent continues to flow into the switching devices in the driver section 14 while no constant-current chopping is performed. Thus, the length of the mask period T should be set appropriately (at about several hundred nanoseconds to several microseconds; in this embodiment, three microseconds) so that it is long enough to ignore the unnecessary noise and thereby avoid false detection of overcurrent but short enough to prevent the switching devices from being destroyed by the overcurrent flowing thereinto during the counting of the mask period T.

As described above, the motor drive device 1c of this embodiment includes: the chopping signal generating means 151 and 153 for generating, when the current i1 flowing through the switching devices in the driver section 14 reaches the first threshold value (a threshold value set by the first threshold voltage Vth1), the first chopping signal Sa for chopping the on-period of the switching devices; the overcurrent protection section 16 for generating, when the current i1 flowing through the switching devices reaches the third threshold value (a threshold value set by the third threshold voltage Vth3) greater than the first threshold value and thereafter remains equal to the third threshold value for a duration equal to the predetermined mask period T, the overcurrent protection signal Se for latching the switching devices in an off state; and chopping signal interrupting means 154 and 155 for interrupting the first chopping signal Sa when the overcurrent protection section 16 detects the current flowing through the switching devices to have reached the third threshold value greater than the first threshold value (in the third embodiment, when the trigger signal Sd turns high).

With this configuration, it is possible to achieve the same effect as in the first embodiment without the use of the comparator 152. This helps reduce the size and cost of the device.

The motor drive device 1c of this embodiment includes means for generating, in separate systems, the first and second reference voltages Vref1. and Vref2 whose voltage levels vary according to the current i1 (or its monitoring current i2) flowing through the switching devices in the driver section 14 so that, while the chopping signal generating means 151 and 153 in the constant-current chopping section 15 generate the first chopping signal Sa based on the first reference voltage Vref1, the overcurrent protection section 16 and the chopping signal interrupting means 154 and 155 in the constant-current chopping section 15 respectively generate and interrupt the overcurrent protection signal Se and the first chopping signal Sa based on the second reference voltage Vref2.

With this configuration, it is possible to prevent malfunctioning resulting from the false detection of overcurrent. In particular, with the configuration in which the second reference voltage Vref2 referred to by the overcurrent protection section 16 is generated by the sense resistor 161 inside the device, even if the sense resistor Rex1 outside the device has poor contact, is short-circuited or otherwise fails and thus the first reference voltage Vref1 cannot be properly generated, overcurrent protection (the latching of the switching devices in an off state in the event of overcurrent) can be performed successfully. This helps achieve improved reliability and safety of the device.

In the motor drive devices 1a to 1c of the first to third embodiments described above, N-channel field-effect transistors may be used as the power transistors P1 to P3 of the driver section 14.

Figure 5:
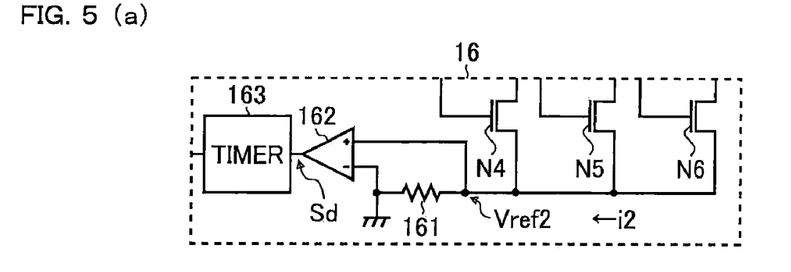
[FIGS. 5(a) and 5(b)] Diagrams showing examples of alternative configurations of the overcurrent protection sections 16 and 18 respectively.

The overcurrent protection sections 16 and 18 may be configured as shown in FIGS. 5(a) and 5(b) respectively. Specifically, the voltages across the sense resistors 161 and 181 may be applied to the comparators 162 and 182 respectively, each having an offset voltage of several tens of millivolts (which corresponds to the third threshold value Vth3 described previously), so that the timer circuits 163 and 183 are turned on and off according to the output logic levels of the comparators 162 and 182 respectively.

INDUSTRIAL APPLICABILITY

The present invention offers a useful technology in achieving improved reliability and safety in motor drive devices and in electric devices incorporating such motor drive devices, and is suitable for all kinds of motor drive devices that perform constant-current chopping, such as DC motors, stepping motors and three-phase brushless motors.

What is claimed is:

1. A motor drive device for turning on and off an output stage switching device to control driving of a motor, the motor drive device comprising:
a chopping signal generator to generate, when a current flowing through the switching device reaches a first threshold value, a chopping signal for chopping an on-period of the switching device;
a chopping signal interrupter to interrupt the chopping signal when the current flowing through the switching device reaches a second threshold value greater than the first threshold value; and
an overcurrent protector to generate, when the current flowing through the switching device reaches a third threshold value greater than the first threshold value and thereafter remains equal to the third threshold value for a duration equal to a predetermined threshold period, an overcurrent protection signal for latching the switching device in an off state.

2. The motor drive device of claim 1, wherein the second threshold value is equal to the third threshold value.

3. The motor drive device of claim 1, further comprising:
a first reference voltage generator to generate a first reference voltage whose voltage level varies according to the current flowing through the switching device; and
a second reference voltage generator to generate a second reference voltage whose voltage level varies according to the current flowing through the switching device,
wherein the chopping signal generator and the chopping signal interrupter are arranged, respectively, to generate and interrupt the chopping signal based on the first reference voltage, and the overcurrent protector is arranged to generate the overcurrent protection signal based on the second reference voltage.

4. A motor drive device for turning on and off an output stage switching device to control driving of a motor, the motor drive device comprising:
a chopping signal generator to generate, when a current flowing through the switching device reaches a first threshold value, a chopping signal for chopping an on-period of the switching device;
an overcurrent protector to generate, when the current flowing through the switching device reaches a second threshold value greater than the first threshold value and thereafter remains equal to the second threshold value for a duration equal to a predetermined threshold period, an overcurrent protection signal for latching the switching device in an off state; and
a chopping signal interrupter to interrupt the chopping signal when the overcurrent protector detects the current flowing through the switching device to have reached a second threshold value greater than the first threshold value.

5. The motor drive device of claim 4, further comprising:
a first reference voltage generator to generate a first reference voltage whose voltage level varies according to the current flowing through the switching device; and
a second reference voltage generator to generate a second reference voltage whose voltage level varies according to the current flowing through the switching device,
wherein the chopping signal generator is arranged to generate the chopping signal based on the first reference voltage, and the overcurrent protector and the chopping signal interrupter are arranged, respectively, to generate and interrupt the overcurrent protection signal and the chopping signal based on the second reference voltage.

6. An electric device comprising:
a motor; and
a motor drive device for controlling driving of the motor,
wherein the electric device includes, as the motor drive device, the motor drive device of any one of claims 1 to 5.

* * * * *